United States Patent [19]

Kesl et al.

[11] 3,795,118

[45] Mar. 5, 1974

[54] KNUCKLE SHIELD

[75] Inventors: Elmer M. Kesl; Ronald F. Zitko, both of Downers Grove, Ill.

[73] Assignee: International Harvester Company, Chicago, Ill.

[22] Filed: June 19, 1972

[21] Appl. No.: 263,827

[52] U.S. Cl. .............................. 64/32 F, 64/3, 64/21
[51] Int. Cl. .............................................. F16d 3/84
[58] Field of Search ....... 64/32 R, 32 F, 17 R, 3, 21

[56] References Cited
UNITED STATES PATENTS

| | | | |
|---|---|---|---|
| 2,264,728 | 12/1941 | Stillwagon et al. | 64/32 F |
| 2,648,208 | 8/1953 | Stillwagon | 64/32 F |
| 2,904,356 | 9/1959 | Love | 64/32 F |
| 3,430,457 | 3/1969 | Gee | 64/32 R |
| 3,703,089 | 11/1972 | Geisthoff et al. | 64/17 R |

FOREIGN PATENTS OR APPLICATIONS

| | | | |
|---|---|---|---|
| 709,117 | 5/1954 | Great Britain | 64/32 F |

Primary Examiner—Manuel A. Antonakas
Assistant Examiner—Randall Heald
Attorney, Agent, or Firm—Dennis K. Sullivan; Floyd B. Harman

[57] ABSTRACT

A flexible shield for a universal joint or knuckle made of elastomer material having stretchable end portions which are adapted to be stretch fitted over disk-like end supports which are rotatably mounted on the ends of the knuckle. The shield is a tubular structure and has an annular central body portion and folds at opposite ends of the body portion and the folds are connected to end portions which are shaped as annuli each having an internal annular groove receiving the periphery of the respective support with a sphincteral grip. At least one disk-like support may be optionally formed with a cam-edged slot to facilitate application of the annulus onto the support.

In the embodiments of the invention the folds and body portion are of stepped diameters so that in compression they intercollate.

11 Claims, 8 Drawing Figures

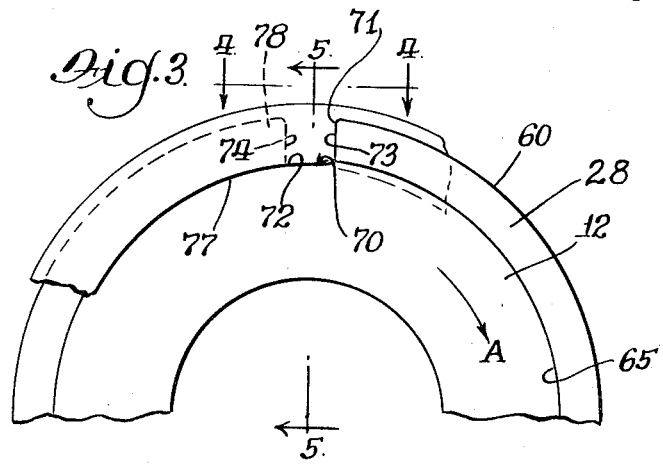
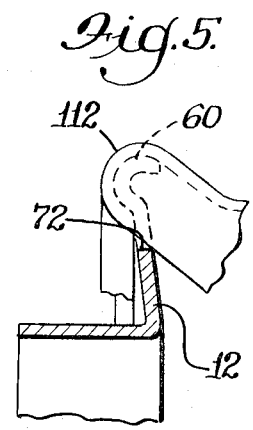
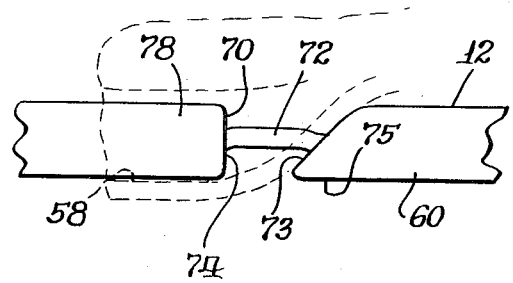
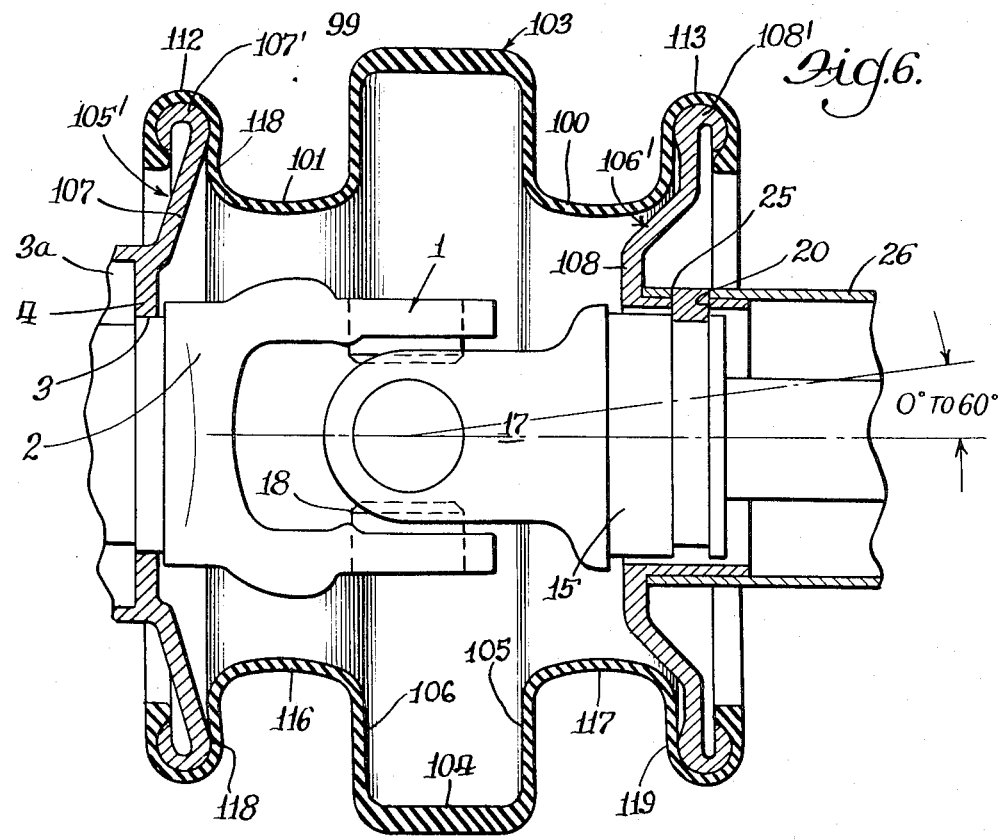

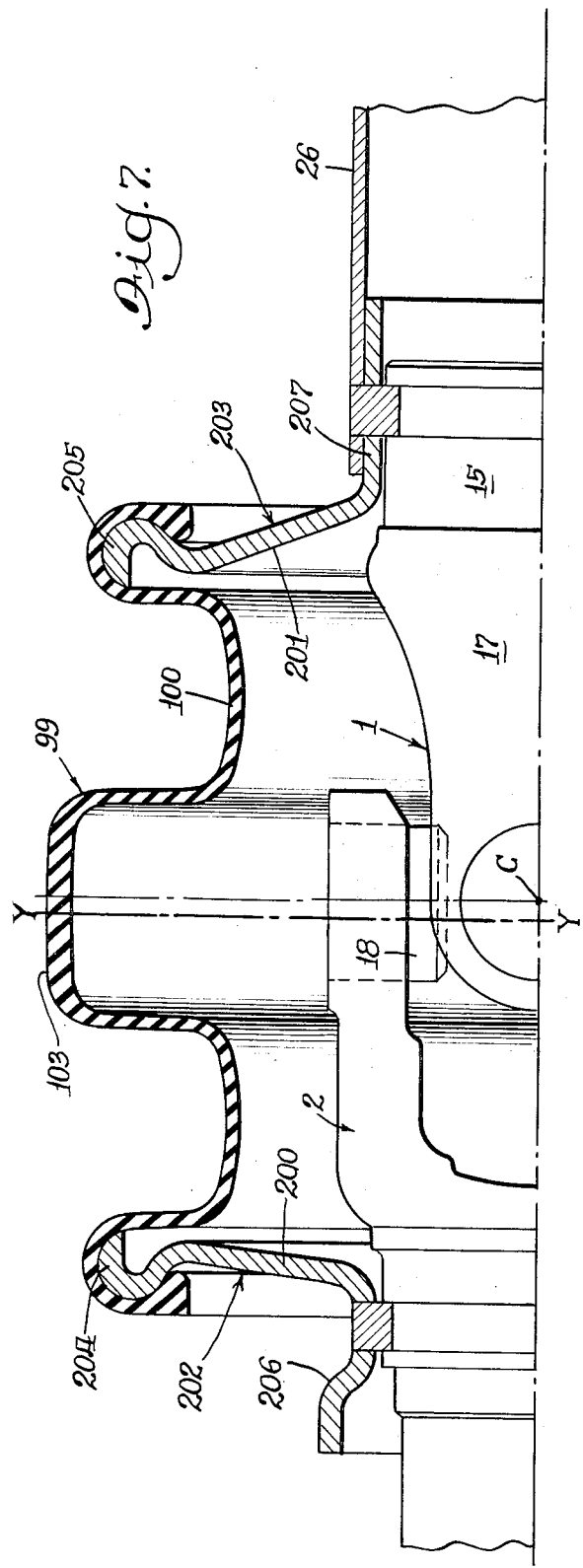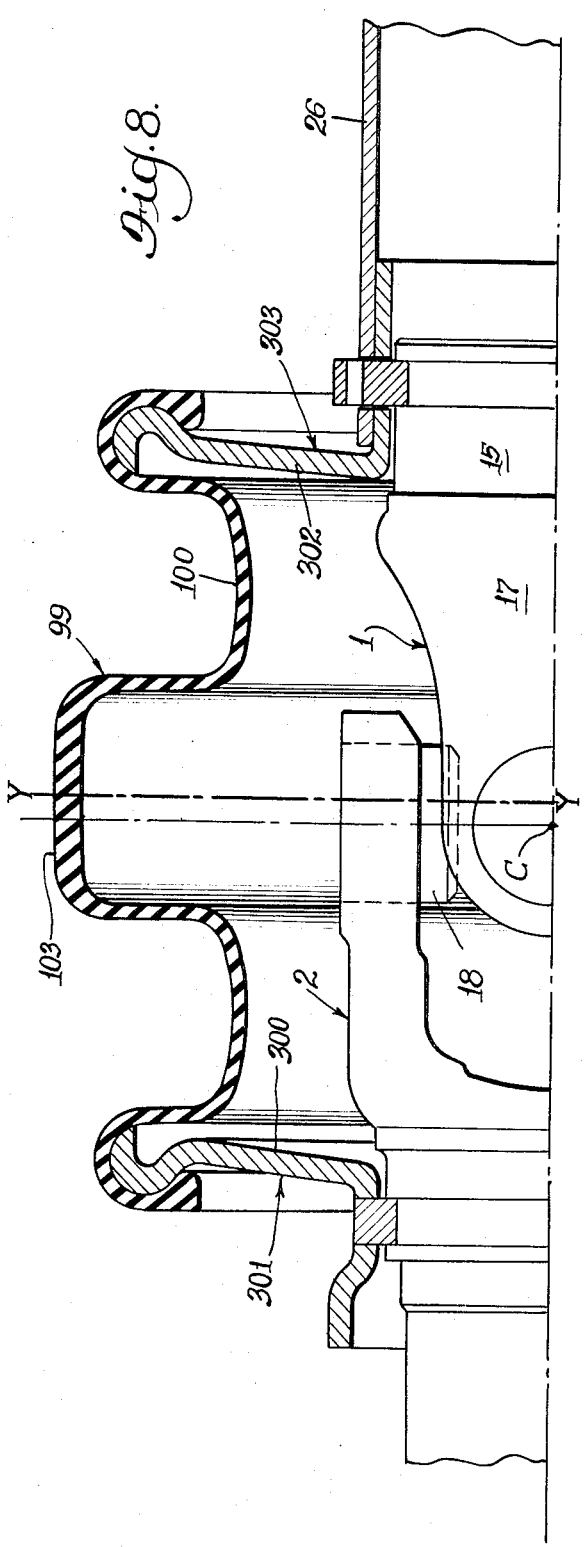

KNUCKLE SHIELD

DISCUSSION OF THE PRIOR ART

In prior art structures, flexible rubber shields or "boots" as they are known, are limited in the amount of angularity which a universal joint or knuckle may assume. The folds, being of equal diameter, align themselves and when the knuckle angles, the inside portion of the shield compresses and will normally bulge inwardly and contact the rotating knuckle and is either abraded or torn apart.

Furthermore, the problem is complicated in that if the material is too flexible to accommodate deformation, it is unstable and will whip around and distort against the rotating knuckle and be torn and because of its excessive flexibility, fails in its primary function of shielding the dangerous knuckle.

SUMMARY OF THE INVENTION

This invention is concerned with a shield for a power transmitting knuckle.

A general object of the invention is to provide a shield made of elastomeric material such as rubber or synthetic materials and wherein convolutions are formed to telescope during angling of the knuckle covered by the shield.

A more specific object of the invention is to provide a novel shield of flexible material which is contoured to provide adequate stability and sufficient distortability during angling without encroaching onto the knuckle.

A further object is to provide a novel flexible shield comprising a tubular member which is adapted to enclose a knuckle and which comprises a plurality of folds of different diameters which nest into one another to accommodate angular displacements of the material constituting the shield.

The invention comprehends a novel shield which comprises an annular center body portion and folds at opposite ends of an axially wide body portion, the body portion being contoured to bulge outwardly during angling of the knuckle.

A further object is to provide a shield assembly which may be readily disassembled to expose the knuckle for periodic lubrication or maintenance.

Another object is to provide a novel means to facilitate assembly of the boot with the end members.

These and other objects and advantages inherent in and encompassed by the invention will become more apparent from the specification and the drawings wherein:

FIG. 3 is a partial side elevational view of one of the end disks and showing threading of the shield end portion thereon;

FIG. 4 is an edge view of an end disk taken substantially on line 4—4 of FIG. 3, the shield portion being shown in phantom lines;

FIG. 5 is a cross-sectional view taken substantially on line 5—5 of FIG. 3; and

FIG. 6 is a longitudinal sectional view of another embodiment of the invention.

FIG. 7 is a fragmentary view comparable to FIG. 6 illustrating the invention in an ASAE category IV knuckle application; and FIG. 8 illustrates the structure shown in FIGS. 6–8 in an ASAE category III knuckle application.

DESCRIPTION OF FIGURES 1–5

Figure 1:
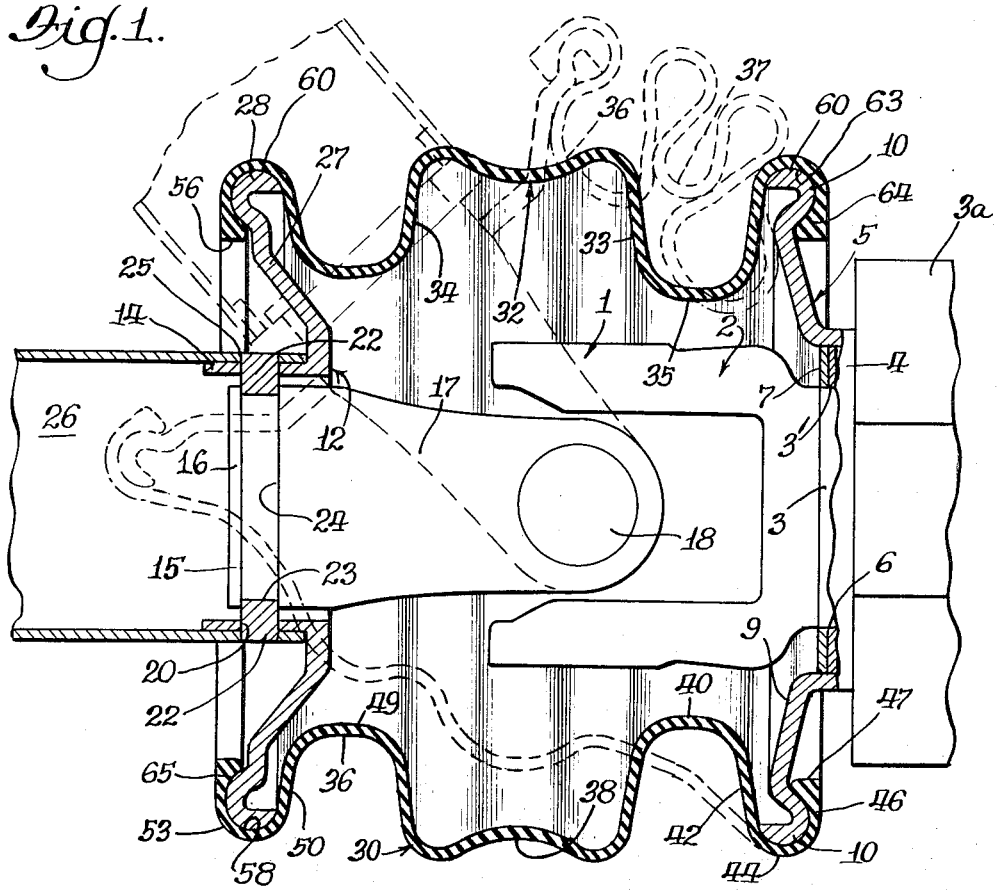
FIG. 1 is a longitudinal sectional view of one form of the novel shield shown in association with a knuckle in a plurality of positions, the angled position being shown in phantom lines.
Figure 2:
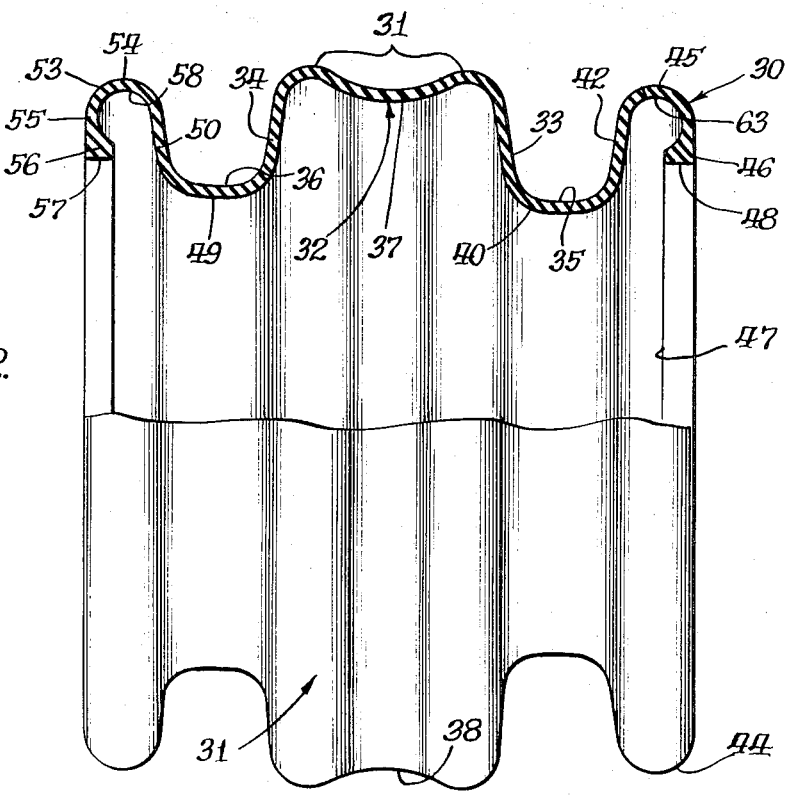
FIG. 2 is a side elevational view of the shield partly in longitudinal section.

Having reference to FIGS. 1–5 of the drawings, there is shown a typical power transmitting knuckle or universal joint generally designated 1 which has a yoke 2 with hub 3 supporting a coupler lock structure 3a which is adapted to interlock the hub with the power input shaft (not shown).

The hub has a cylindrical periphery 3' on which a hub 4 of a metal or plastic, preferably nylon, end disk or support 5 is rotatably mounted. The disk hub or nave 4 has a center aperture 6 which provides a bearing surface which slides upon the surface 3. The disk hub 4 is interlocked with the hub 3 against axial displacement and is herein shown as interposed between a shoulder washer 7 and the coupler lock structure 3a which is suitably secured on the hub 3. The disk 5 has an inwardly dished plate portion 9 and a peripheral annular bead 10.

Another disk of support 12 or plastic, such as nylon or the like, is provided at the opposite end of the knuckle and has a center sleeve or nave 14 which encompasses a cylindrical peripheral surface 15 of hub 16 of a yoke 17 of the knuckle 1. The yokes 17 and 2 are interconnected by a cross 18 as well known. The sleeve 14 is provided with radial openings 20 which receive projections 22, 22 therethrough formed on a locking ring 23 which slides within a groove 24 in the hub surface 15. The projections 22 also extend into aligned radial openings 25 in a tube or sleeve 26 which is adapted to cover a power transfer shaft (not shown) which connects to a hub 16. The sleeve 14 is integrally formed with a dished disk or plate portion 27 of disk 12 and the plate portion is dished outwardly and is formed with an enlarged annular peripheral bead 28.

A tubular shield or boot 30 of elastomer material such as neoprene or other flexible plastic material extends between the end disk 5 and 12. The shield comprises a center body section 31 with a shallow, generally cylindrical center fold or corrugation 32. The body portion 31 is flanked by inner end walls 33 and 34 of folds or pleats 35 and 36. The body portion corrugation has a transversely curved section 37 (FIG. 2) which is bowed inwardly and forms an annular groove 38. This construction increases the stiffness of the center portion and minimizes its distortion upon rotation of the shield and is intended to prevent inward collapse when stretched.

The end wall 33 of the pleat 35 merges at its radially inner edge with a bight 40 which is curved transversely and bowed inwardly and extends axially widthwise and merges with the outer wall or web 42 of the pleat 35. The end wall 42 merges at its radially outer edge into an annulus or securing ring 44 which has an outwardly convexed bight 45 (FIG. 2) which merges with an outer inwardly extending flange 46. The flange 46 terminates in an enlarged inwardly directed bead 47 which defines a disk-admitting aperture 48.

Similarly the wall 34 of pleat 36 merges into an inwardly convexed bight 49 which extends widthwise axially of the shield and at its outer edge merges into the inner edge of the outer wall or web 50 of pleat 36 which extends radially transversely of the axis of the shield and at its outer edge merges with an annulus or securing ring 53 which has an outwardly convexed outer bight 54 which joins at its outer end with an inwardly directed flange 55. The inner edge of flange 55 is formed with a bead 56 which defines an opening 57 for admitting the disk 5 or 12 into an inwardly opening groove 58 formed in the ring 53.

It will be noted that the disk beads 10 and 28 are of identical construction and each is somewhat C-shaped in cross section providing a cylindrical outer peripheral contour 60 which fits into the complementary surface of groove 58 or into the groove 63 formed in the interior of the ring 44. The beads 10 and 28 project axially outwardly of the plate portions of the respective disks and define inward shoulders 64, 65 beneath which project the beads 47 and 56 respectively and interlock therewith.

It will also be noted that the folds 35 and 36 are of unequal depth in that the bight 40 is of lesser diameter than the bight 49 (FIG. 1) and that bight 49 is located inwardly of the nadir of the corrugation 37. Thus during angling of the driving and driven knuckle portions, as shown in FIG. 1, the segments of pleat 35 nest within the body portion 37 and segments of the pleat 36 nest within the pleat 35, and at the same time the portions of the shield on the outside of the angle have enough length of material to elongate.

One of the problems which arise in the use of this type of shield is in the difficulty encountered in applying the shield to the respective end disk since the end rings of the shield have a sphincteral hold or grip on the respective disks. Removal from the disk is rather simple and is effected by stretching the end ring off the respective disk and displacing it inwardly of the disk. Application however is difficult. In order to alleviate this problem, each disk is provided with a peripheral notch 70 (FIGS. 3 and 4) having an open end 71 at the outer edge of the disk, an inner base edge 72 and circumferentially spaced side edges 73 and 74. The guide edge 73 is beveled at preferably 45° angle toward the outer side 75 of the related disk and the edge 74 is essentially parallel with the axis of the disk.

In order to apply the removed end ring of the shield to the respective disk, a section of the ring is positioned through the notch 70 so that a portion 77 thereof overlaps the receiver edge portion 78 (FIG. 4) of the disk, which edge portion 78 is entered into the groove 58 or 63. The outer side of the respective ring is guided by the diagonal guide surface 73 which directs the outer flange of the related ring portion toward the outer side of the respective disk pursuant to rotation of the disk in the direction of the arrow A in FIG. 3 until the entire ring encircles the bead of the respective disk. To remove the shield from either disk, the shield is stretched off the respective end member or support disk.

EMBODIMENT OF FIGURE 6

In this embodiment parts common with the previous embodiment, will be identified with the same corresponding reference numerals.

In this modification, the shield or boot 99 comprises pleats 100 and 101 which are of the, different depths and an enlarged center body section 103 which is of generally cylindrical shape having a cylindrical annulus 104 and flanking side walls 105 and 106 which extend inwardly of the annulus 104 and form the inner walls of the pleats or folds 100 and 101. The annulus 104 is of arcuate-cross section and substantially thicker than the walls 105 and 106 and is bulged outwardly to prevent inward buckling of the annulus on changing of the knuckle center line angle. The end disks 105', 106' are similar to the previously described disks 5 and 12 except for their specific configuration to fit particular adaptations. They each however have an outer rolled bead of a construction 107', 108' somewhat similar to that shown in the previous embodiment except that the roll is outwardly of the respective disk portions 107 and 108 whereas in the previous embodiment they were rolled inwardly.

The entire shield is made of elastomer material, preferably synthetic rubber such as neoprene. It will be noted that the ring portions 112, 113 at the ends of the tubular shield are of lesser diameter than the body portion annulus 104 so that during compression these portions will nest into the annulus which has sufficient width to accommodate such inward distortion of the side walls thereadjacent. The width of the body portion, the lengths of the inner walls 105, 106 and the bight portions 116, 117, and the radial extents of the outer walls 118, 119 of the pleats 100, 101 respectively are sufficient to expand on the tension side of the shield to accommodate maximum angling. The portions 116, 117 are related at essentially right angles to walls 105, 106 which have a substantially right angular relation to the annulus 104. This maximizes the lengths of walls 105, 106 to obtain adequate stretch on the outside of the angled knuckle. By restricting the design to two pleats and intermediate body portion a stable structure is achieved which is conducive to good manufacturing practices. A large angular range is provided for, from 0° to 60° in each direction. It is to be understood that the end supports are rotatably mounted in each embodiment on the drive assembly and when contacted by any stationary object, such shield will stop rotating, but will rotate when free of a stopping force due to the frictional drag between the disk bearing surfaces and the mounting structures of the power train therefor.

DESCRIPTION OF EMBODIMENT OF FIG. 7

Parts in this embodiment are essentially identical except for size with the previous embodiment which will be identified with the same reference numerals.

In this embodiment the plates or disks 200 and 201 of the end supports 202, 203 are dished inwardly whereby the bead portions 204, 205 thereof are offset inwardly of the hub portions 206, 207.

As best seen in FIG. 7 of the drawing, the center C of the cross of the knuckle 1 is in a plane which is to the right of the transverse center plane y—y of the boot or shield 99.

DESCRIPTION OF EMBODIMENT OF FIG. 8

Parts in this embodiment which are essentially identical except for size with the previous embodiments will be identified by the same reference numerals.

In this embodiment the plate portion 300 of the end support 301 is dished inwardly toward the knuckle 1 and the plate 302 of the end support 303 is dished outwardly, that is away from the knuckle. This arrangement of end plates causes the shield or boot 99 to be displaced rightwardly. That is, the center C of the knuckle 1 is to the left of the transverse center plane y—y of the shield.

It will be readily noted that the instant invention is readily applicable to different categories (sizes) of knuckles by providing different types of end plates and correspondingly proportioned shields.

Although the invention has been described and illustrated with respect to several preferred embodiments thereof, it is to be understood it is not to be so limited since changes and modifications may be made therein which are within the full intended scope of the invention as set forth in the appended claims.

What is claimed is:

1. A knuckle shield comprising a tubular flexible structure adapted to be sleeved over a knuckle and having a plurality of pleats of different diameters adapted upon compression due to angling of the knuckle to telescope within one another to accommodate adequate angling movements of the knuckle and a pair of disk-like end members mounted on opposite ends of the knuckle and rotatable relative thereto, said tubular structure having ring portions sleeved respectively over said end members.

2. The invention according to claim 1 and at least one of said end members having a notch in the outer peripheral portion thereof and a cam surface on a side of the notch for reception of a portion of the respective ring to facilitate application of the ring over the end member by relatively rotating the same.

3. The invention according to claim 1 and said tubular structure having a relatively wide generally cylindrical intermediate body portion.

4. The invention according to claim 3 and said body portion comprising an annulus with a concentric corrugation and pleats located at each end of said body portion, said corrugation providing rigidity to the annulus and expansion of said annulus axially of said tubular structure.

5. A shield for a knuckle having annular bearing surfaces at opposite ends, a pair of disk-like end members rotatably mounted respectively on each of said bearing surfaces, a tubular structure of elastomeric material adapted to be sleeved over the knuckle and having radially expandable end portions respectively sphincterally embracing said disk-like members, and said tubular structure comprising a generally cylindrical central portion and pleat means of different diameters respectively interconnecting the central portion with said end portions.

6. The invention according to claim 5 and said pleat means each comprising a single pleat the pleat, at one end of the central portion having a larger internal diameter than the pleat at the other end of the central portion.

7. The invention according to claim 6 and the pleats and central portion having telescoping relation axially of the structure during angling movements of the knuckle.

8. The invention according to claim 7 and said central portion having at least one corrugation.

9. The invention according to claim 5 and wherein each end member comprises a circular disk, a notch extending inwardly from the outer perimeter of the disk, and said end portions comprise a circular outer flange adapted to be entered diagonally into the notch and partly extended outwardly of the disk, said disk being relatively rotatable with respect to the flange to pass the flange from inwardly of the disk to outwardly thereof and enter the edge of the disk into an internal annular groove in the respective end portion with the end portion embracing said disk.

10. The invention according to claim 5 and said center portion comprising an annulus and wall portions forming said pleats flanking and joined with said annulus, said annulus being of arcuate cross-section and being bowed outwardly to prevent inward buckling thereof during angled positioning of the knuckle.

11. The invention according to claim 10 and said annulus being of thicker cross-section than said wall portion, said wall portions extending essentially at right angles to said annulus.

* * * * *